United States Patent
Ciaramella et al.

(10) Patent No.: US 7,945,161 B2
(45) Date of Patent: May 17, 2011

(54) CHANNEL POWER PRE-EMPHASIS IN WAVELENGTH DIVISION MULTIPLEX OPTICAL COMMUNICATION SYSTEMS

(75) Inventors: Ernesto Ciaramella, Rome (IT); Fabio Cavaliere, Vacchiano (IT); Luca Giorgi, Perignano (IT)

(73) Assignee: Ericsson AB, Stockholm (SE)

( * ) Notice: Subject to any disclaimer, the term of this patent is extended or adjusted under 35 U.S.C. 154(b) by 778 days.

(21) Appl. No.: 11/572,549

(22) PCT Filed: Jul. 22, 2005

(86) PCT No.: PCT/EP2005/053592
§ 371 (c)(1),
(2), (4) Date: Oct. 10, 2007

(87) PCT Pub. No.: WO2006/008321
PCT Pub. Date: Jan. 26, 2006

(65) Prior Publication Data
US 2008/0037983 A1 Feb. 14, 2008

(30) Foreign Application Priority Data
Jul. 23, 2004 (IT) .............. MI2004A1493

(51) Int. Cl.
H04B 10/08 (2006.01)
(52) U.S. Cl. .............. 398/34; 398/25; 398/27
(58) Field of Classification Search ......... 398/27, 398/38, 25, 26, 79, 33, 34
See application file for complete search history.

(56) References Cited

U.S. PATENT DOCUMENTS

| | | |
|---|---|---|
| 2002/0048062 A1 | 4/2002 | Sakamoto et al. |
| 2002/0054648 A1 | 5/2002 | Krummrich et al. |
| 2002/0178417 A1 | 11/2002 | Jacob et al. |
| 2004/0037569 A1 * | 2/2004 | Kamalov et al. .......... 398/162 |

FOREIGN PATENT DOCUMENTS

| | | |
|---|---|---|
| EP | 1365529 | 11/2003 |
| JP | 2002057624 | 2/2002 |

* cited by examiner

*Primary Examiner* — M. R. Sedighian
(74) *Attorney, Agent, or Firm* — Coats & Bennett, P.L.L.C.

(57) ABSTRACT

An iterative method for power pre-emphasis of N optical channels in a Wavelength Division Multiplex (WDM) signal in an optical communication systems in accordance with which representative Xi characteristics are defined for the channels with among the characteristics there being included at least one characteristic that is a function of the Bit Error Rate (BER). The method including the iterative phases of running through the WDM signal channels and appraising for each channel said characteristics for the channel and for the channels adjacent thereto; comparing said channel characteristics with the homologous characteristics of the adjacent channels and, based on the results of the comparisons, selecting a predetermined action to be performed on the power transmitted on the ith channel; for all the channels, performing on the power of each the corresponding selected action; calculating a metric quality function of all the channels with the new powers changed with the selected actions and repeating the previous iterative phases from the beginning until the quality improvement is greater than a predetermined figure and/or a predetermined maximum number of iterations is reached.

34 Claims, 13 Drawing Sheets

| $i=1, i=N$ | Graphic representation | $C_{Xi}$ |
|---|---|---|
| $X_N > X_{N-1}$ or $X_1 < X_2$ | ![](1 2 ... N-1 N) | 1 |
| $X_N < X_{N-1}$ or $X_1 > X_2$ | ![](1 2 ... N-1 N) | 2 |
| $X_N = X_{N-1}$ or $X_1 = X_2$ | ![](1 2 ... N-1 N) | 3 |

Fig.2b

| CORRISPONDENCE TABLE: Z | | |
|---|---|---|
| Ac | Description Action | Implemented Action |
| 0 | Any action | $T_i(k+1) = T_i(k)$ |
| 1 | Either increase the power by one step or set it to the same value as the neighbour channel (if difference is > step) | $\Delta_{-1} = T_{i-1}(k) - T_i(k)$, $\Delta_{+1} = T_{i+1}(k) - T_i(k)$, $T_i(k+1) = T_{i+1}(k) + \max(\Delta_{-1}, \Delta_{+1}, \Delta)$ |
| 2 | Either decrease the power by one step or set it to the same value as the neighbour channel (if difference is > step) | $\Delta_{-1} = T_i(k) - T_{i-1}(k)$, $\Delta_{+1} = T_i(k) - T_{i+1}(k)$, $T_i(k+1) = T_{i+1}(k) - \max(\Delta_{-1}, \Delta_{+1}, \Delta)$ |
| 3 | Increasing the channel power by $\Delta$; | $T_i(k+1) = T_i(k) + \Delta$ |
| 4 | Decreasing the channel power by $\Delta$; | $T_i(k+1) = T_i(k) - \Delta$ |
| 5 | Setting the power of the channel under test to the power of the adjacent channel with the best Q-factor | if $Q_{i-1}(k) < Q_{i+1}(k)$ then $T_i(k+1) = T_{i+1}(k)$ else $T_i(k+1) = T_{i-1}(k)$ |
| 6 | Setting the power of the channel under test to that of the adjacent channel on the left | $T_i(k+1) = T_{i-1}(k)$ |
| 7 | Setting the power of the channel under test to that of the adjacent channel on the right | $T_i(k+1) = T_{i+1}(k)$ |

Fig.3

| Table A: inner channels | | | |
|---|---|---|---|
| $C_{Qi}$ | $C_{Ti}$ | $C_{Gti}$ | $A_C$ |
| 1 | 1 | 1 | 5 |
| 1 | 1 | 2 | 5 |
| 1 | 1 | 3 | 5 |
| 1 | 1 | 4 | 5 |
| 1 | 1 | 5 | 5 |
| 1 | 2 | 1 | 5 |
| 1 | 2 | 2 | 0 |
| 1 | 2 | 3 | 5 |
| 1 | 2 | 4 | 4 |
| 1 | 2 | 5 | 0 |
| 1 | 3 | 1 | 3 |
| 1 | 3 | 2 | 7 |
| 1 | 3 | 3 | 3 |
| 1 | 3 | 4 | 4 |
| 1 | 3 | 5 | 0 |
| 1 | 4 | 1 | 5 |
| 1 | 4 | 2 | 5 |
| 1 | 4 | 3 | 5 |
| 1 | 4 | 4 | 5 |
| 1 | 4 | 5 | 5 |
| 1 | 5 | 1 | 3 |
| 1 | 5 | 2 | 5 |
| 1 | 5 | 3 | 3 |
| 1 | 5 | 4 | 4 |
| 1 | 5 | 5 | 0 |
| 2 | 1 | 1 | 5 |
| 2 | 1 | 2 | 5 |
| 2 | 1 | 3 | 5 |
| 2 | 1 | 4 | 0 |
| 2 | 1 | 5 | 0 |
| 2 | 2 | 1 | 6 |
| 2 | 2 | 2 | 6 |
| 2 | 2 | 3 | 6 |
| 2 | 2 | 4 | 6 |
| 2 | 2 | 5 | 6 |
| 2 | 3 | 1 | 6 |
| 2 | 3 | 2 | 4 |
| 2 | 3 | 3 | 6 |
| 2 | 3 | 4 | 6 |
| 2 | 3 | 5 | 6 |
| 2 | 4 | 1 | 0 |
| 2 | 4 | 2 | 0 |

Fig.4a

| Table A: inner channels | | | |
|---|---|---|---|
| $C_{Qi}$ | $C_{Ti}$ | $C_{Gti}$ | $A_C$ |
| 2 | 4 | 3 | 6 |
| 2 | 4 | 4 | 6 |
| 2 | 4 | 5 | 2 |
| 2 | 5 | 1 | 4 |
| 2 | 5 | 2 | 0 |
| 2 | 5 | 3 | 3 |
| 2 | 5 | 4 | 3 |
| 2 | 5 | 5 | 0 |
| 3 | 1 | 1 | 7 |
| 3 | 1 | 2 | 4 |
| 3 | 1 | 3 | 7 |
| 3 | 1 | 4 | 0 |
| 3 | 1 | 5 | 1 |
| 3 | 2 | 1 | 7 |
| 3 | 2 | 2 | 7 |
| 3 | 2 | 3 | 7 |
| 3 | 2 | 4 | 7 |
| 3 | 2 | 5 | 7 |
| 3 | 3 | 1 | 7 |
| 3 | 3 | 2 | 7 |
| 3 | 3 | 3 | 7 |
| 3 | 3 | 4 | 7 |
| 3 | 3 | 5 | 7 |
| 3 | 4 | 1 | 0 |
| 3 | 4 | 2 | 4 |
| 3 | 4 | 3 | 0 |
| 3 | 4 | 4 | 4 |
| 3 | 4 | 5 | 2 |
| 3 | 5 | 1 | 3 |
| 3 | 5 | 2 | 3 |
| 3 | 5 | 3 | 3 |
| 3 | 5 | 4 | 3 |
| 3 | 5 | 5 | 0 |
| 4 | 1 | 1 | 0 |
| 4 | 1 | 2 | 0 |
| 4 | 1 | 3 | 0 |
| 4 | 1 | 4 | 0 |
| 4 | 1 | 5 | 0 |
| 4 | 2 | 1 | 0 |
| 4 | 2 | 2 | 0 |
| 4 | 2 | 3 | 0 |
| 4 | 2 | 4 | 0 |
| 4 | 2 | 5 | 0 |
| 4 | 3 | 1 | 0 |
| 4 | 3 | 2 | 0 |
| 4 | 3 | 3 | 0 |
| 4 | 3 | 4 | 0 |

Fig.4b

| Table A: inner channels | | | |
|---|---|---|---|
| $C_{Oi}$ | $C_{Ti}$ | $C_{Gti}$ | $A_C$ |
| 4 | 3 | 5 | 0 |
| 4 | 4 | 1 | 0 |
| 4 | 4 | 2 | 0 |
| 4 | 4 | 3 | 0 |
| 4 | 4 | 4 | 0 |
| 4 | 4 | 5 | 0 |
| 4 | 5 | 1 | 4 |
| 4 | 5 | 2 | 4 |
| 4 | 5 | 3 | 4 |
| 4 | 5 | 4 | 3 |
| 4 | 5 | 5 | 0 |
| 5 | 1 | 1 | 3 |
| 5 | 1 | 2 | 3 |
| 5 | 1 | 3 | 3 |
| 5 | 1 | 4 | 3 |
| 5 | 1 | 5 | 3 |
| 5 | 2 | 1 | 3 |
| 5 | 2 | 2 | 3 |
| 5 | 2 | 3 | 3 |
| 5 | 2 | 4 | 4 |
| 5 | 2 | 5 | 0 |
| 5 | 3 | 1 | 3 |
| 5 | 3 | 2 | 4 |
| 5 | 3 | 3 | 0 |
| 5 | 3 | 4 | 4 |
| 5 | 3 | 5 | 0 |
| 5 | 4 | 1 | 0 |
| 5 | 4 | 2 | 4 |
| 5 | 4 | 3 | 4 |
| 5 | 4 | 4 | 4 |
| 5 | 4 | 5 | 4 |
| 5 | 5 | 1 | 0 |
| 5 | 5 | 2 | 0 |
| 5 | 5 | 3 | 3 |
| 5 | 5 | 4 | 0 |
| 5 | 5 | 5 | 0 |

Fig.4c

| Table A₁: First Channel ||||
|---|---|---|---|
| $C_{Qi}$ | $C_{Ti}$ | $C_{Gti}$ | $A_C$ |
| 1 | 1 | 1 | 1 |
| 1 | 1 | 2 | 1 |
| 1 | 1 | 3 | 1 |
| 1 | 2 | 1 | 4 |
| 1 | 2 | 2 | 2 |
| 1 | 2 | 3 | 2 |
| 1 | 3 | 1 | 3 |
| 1 | 3 | 2 | 9 |
| 1 | 3 | 3 | 0 |
| 2 | 1 | 1 | 3 |
| 2 | 1 | 2 | 0 |
| 2 | 1 | 3 | 0 |
| 2 | 2 | 1 | 3 |
| 2 | 2 | 2 | 3 |
| 2 | 2 | 3 | 0 |
| 2 | 3 | 1 | 4 |
| 2 | 3 | 2 | 0 |
| 2 | 3 | 3 | 0 |
| 3 | 1 | 1 | 0 |
| 3 | 1 | 2 | 0 |
| 3 | 1 | 3 | 3 |
| 3 | 2 | 1 | 0 |
| 3 | 2 | 2 | 4 |
| 3 | 2 | 3 | 4 |
| 3 | 3 | 1 | 4 |
| 3 | 3 | 2 | 4 |
| 3 | 3 | 3 | 0 |

Fig.5

| Table $A_N$: Last Channel | | | |
|---|---|---|---|
| $C_{Qi}$ | $C_{Ti}$ | $C_{Gti}$ | $A_C$ |
| 1 | 1 | 1 | 3 |
| 1 | 1 | 2 | 3 |
| 1 | 1 | 3 | 0 |
| 1 | 2 | 1 | 0 |
| 1 | 2 | 2 | 3 |
| 1 | 2 | 3 | 0 |
| 1 | 3 | 1 | 0 |
| 1 | 3 | 2 | 4 |
| 1 | 3 | 3 | 0 |
| 2 | 1 | 1 | 2 |
| 2 | 1 | 2 | 2 |
| 2 | 1 | 3 | 2 |
| 2 | 2 | 1 | 1 |
| 2 | 2 | 2 | 1 |
| 2 | 2 | 3 | 1 |
| 2 | 3 | 1 | 4 |
| 2 | 3 | 2 | 3 |
| 2 | 3 | 3 | 0 |
| 3 | 1 | 1 | 4 |
| 3 | 1 | 2 | 0 |
| 3 | 1 | 3 | 4 |
| 3 | 2 | 1 | 0 |
| 3 | 2 | 2 | 0 |
| 3 | 2 | 3 | 3 |
| 3 | 3 | 1 | 4 |
| 3 | 3 | 2 | 4 |
| 3 | 3 | 3 | 0 |

Fig.6

| Table A reduced: inner channels | | |
|---|---|---|
| $C_{Qi}$ | $C_{Ti}$ | $A_C$ |
| 1 | 1 | 5 |
| 1 | 2 | 0 |
| 1 | 3 | 0 |
| 1 | 4 | 5 |
| 1 | 5 | 0 |
| 2 | 1 | 0 |
| 2 | 2 | 6 |
| 2 | 3 | 6 |
| 2 | 4 | 2 |
| 2 | 5 | 0 |
| 3 | 1 | 1 |
| 3 | 2 | 7 |
| 3 | 3 | 7 |
| 3 | 4 | 2 |
| 3 | 5 | 0 |
| 4 | 1 | 0 |
| 4 | 2 | 0 |
| 4 | 3 | 0 |
| 4 | 4 | 0 |
| 4 | 5 | 0 |
| 5 | 1 | 3 |
| 5 | 2 | 0 |
| 5 | 3 | 0 |
| 5 | 4 | 4 |
| 5 | 5 | 0 |

Fig.11

| Table A₁ reduced: First Channel | | |
|---|---|---|
| $C_{Qi}$ | $C_{Ti}$ | $A_C$ |
| 1 | 1 | 1 |
| 1 | 2 | 2 |
| 1 | 3 | 0 |
| 2 | 1 | 0 |
| 2 | 2 | 0 |
| 2 | 3 | 0 |
| 3 | 1 | 3 |
| 3 | 2 | 4 |
| 3 | 3 | 0 |

Fig.12

| Table A_N reduced: Last Channel | | |
|---|---|---|
| $C_{Qi}$ | $C_{Ti}$ | $A_C$ |
| 1 | 1 | 0 |
| 1 | 2 | 0 |
| 1 | 3 | 0 |
| 2 | 1 | 2 |
| 2 | 2 | 1 |
| 2 | 3 | 0 |
| 3 | 1 | 4 |
| 3 | 2 | 3 |
| 3 | 3 | 0 |

Fig.13

CHANNEL POWER PRE-EMPHASIS IN WAVELENGTH DIVISION MULTIPLEX OPTICAL COMMUNICATION SYSTEMS

The present invention relates to channel power pre-emphasis in Wavelength Division Multiplex (WDM) optical communication systems, more especially power pre-emphasis based on the monitored channel Bit Error Rate (BER).

The technique of channel power pre-emphasis is a key factor to improved operation of WDM links with in-line optical amplifiers (e.g. Erbium Doped Fibre Amplifiers). Such techniques need to ensure a correct distribution of total power available at the output of the launch optical amplifier so that all the channels can work under the same conditions.

In a real system, it is foreseeable that pre-emphasis techniques be used not only upon start-up of the system but also in various other circumstances such as for example upon updating of the number of channels, restoration after failure, system degradation because of aging etc.

The channel Bit Error Rate (BER) is the only parameter that completely defines the quality of the signal received after being transported by a WDM channel. Known power pre-emphasis techniques are however based on equalization of the OSNR (Optical to Signal Noise Ratio) at the end terminal of the link for a fast but only partial estimate of the performance of the system while ignoring all the other causes that might decrease the performance of the system like for example chromatic dispersion or non-linear effects.

A major reason for the OSNR as the control parameter in power pre-emphasis is that it can be readily measured and in many systems the OSNR often represents the main contribution to the Bit Error Rate. Power pre-emphasis techniques based on OSNR require however the use of expensive optical spectrum analysers. Moreover, OSNR based techniques fail when other phenomena more strongly affect the performance of the system, such as for example:

i. multi-span links realised with small effective area non-dispersion shifted fibres in which the non-linearity of the transmission medium is not negligible;
ii. links presenting a mismatch between the chromatic dispersion slope of the fibre and the Dispersion Compensation Fibre (DCF) where the reach of the channels at the edges of the spectrum is limited by chromatic dispersion;
iii. links where the received powers vary over a wide range from powers near the minimum threshold of receiver sensitivity to powers near overloading of the receiver. In this case, the various channels behave differently even if their OSNRs are similar and costly channel power levelling devices are necessary; and
iv. links in which the channels display different characteristics because of manufacturing tolerances. In such a case, two channels can exhibit different BERs even if they have the same OSNR and same received power.

In the past, accuracy of measurements of the BER was the main problem in implementing a pre-emphasis method based on BER monitoring. Whilst measurement of the OSNR is practically instantaneous, an accurate estimate of the BER requires a long period of time to detect a sufficient number of errors in the received bit; the lower the BER, the longer the time required for determining it. In practice BER requirements are very stringent ($10^{-12}$ or less) and have consequently made power pre-emphasis based on BER impracticable.

The introduction of Forward Error Correction (FEC) codes on WDM channels radically changes this scenario since FEC application produces a BER of $10^{-12}$ or less from uncorrected BERs higher than $10^{-5}$ and this enables accurate measurement of BER in a few seconds. Current WDM systems operate commonly with pre-FEC BER of approximately $10^{-6}$ whilst the FEC chip provides a fast and accurate value of the uncorrected BER.

The inventors have appreciated that the uncorrected BER could provide a powerful tool for optimising performance of WDM systems while at the same time providing a significant cost saving. Indeed, no additional equipment is necessary since the functionality of BER monitoring is already implemented on the commercially available FEC chipsets and many management systems already supply it for the usual OAM purposes.

Even using this pre-FEC BER information, finding a procedure capable of converging in a few iterations to the optimal profile of the powers transmitted is a challenging issue that, in the prior art, has not been solved satisfactorily. As a result the use of the BERs is still not used in practical applications for pre-emphasis of channels.

The difficulties in using BER are due mainly to the fact that the BER is a complicated and generally unknown function of the link and of the characteristics of the line terminals (which can be known only approximately). In contrast the OSNR is a simple monotonic increasing function of the channel power. Until now, no direct technique is known for putting the BER figures in direct relationship with the input powers when non-linear propagation effects degrade the system.

Well-consolidated "blind" algorithms such as the gradient, "steepest descent" or genetic algorithms are not immediately applicable when the BER is used because of their slow convergence.

The general purpose of the present invention is to remedy the above mentioned shortcomings by making available a method for channel pre-emphasis based on BER in WDM communication systems.

In view of this purpose it was sought to provide in accordance with the present invention an iterative method for the power pre-emphasis of N optical channels in a WDM signal in optical communication systems in accordance with which representative $X_i$ characteristics are defined for the channels with among the characteristics there being included at least one characteristic that is a function of the BER and including the iterative phases of running over the WDM signal channels and appraising for each channel said characteristics for the channel and for the channels adjacent thereto; comparing said characteristics of the channel with the homologous characteristics of the adjacent channels and, based on the results of the comparisons, selecting a predetermined action to be performed on the power transmitted on the $i^{th}$ channel; performing for all the channels on the power of each the corresponding selected action; calculating a metric quality function of all the channels with the new powers changed with the selected actions and repeating the previous iterative phases from the beginning until the quality improvement is greater than a predetermined figure and/or a predetermined maximum number of iterations is reached.

Further preferred embodiments of the invention are defined in the sub-claims appended hereto.

In order that the innovative principles of the present invention and its advantages compared with the prior art are better understood, there is described below with the aid of the annexed drawings a possible embodiment thereof by way of non-limiting example applying said principles. In the drawings:

FIGS. 2a, 2b are configuration tables that can be used by the method in accordance with the present invention;

FIG. 3 a table of actions that can be advantageously required of the system;

FIGS. 4a-c are look-up tables for internal channels usable with a procedure in accordance with the present invention;

FIGS. 5 and 6 are look-up tables for the first and last channels respectively;

FIGS. 7 to 10 collectively show a flow diagram of a procedure realized in accordance with the principles of the present invention; and FIGS. 11, 12 and 13 look-up tables similar to those of FIGS. 4, 5 and 6 but reduced by means of a possible simplification procedure introduced in the method in accordance with the present invention.

With reference to the figures, the principles of the present invention will be described.

For simplicity, the Q-factor will be used instead of the pre-FEC BER in following description. The Q-factor is well known to engineers that work in optical communications and is unequivocally correlated with the BER by the equation:

$$BER = \frac{1}{\sqrt{4\pi}} \int_Q^\infty e^{-x^2} dx$$

It can be proven that the BER is a monotonic decreasing function of the Q-factor.

In optical system design, the units of the Q-factor are usually dB where $Q[dB]=20*\log(Q)$. This parameter $Q[dB]$ will be used in the following description but it will be readily appreciated by those in the art that any one of the three parameters chosen from among BER, Q, Q[dB] can be used in the procedure in accordance with the present invention with slight modification without departing from the innovative technique proposed here.

Figure 1:
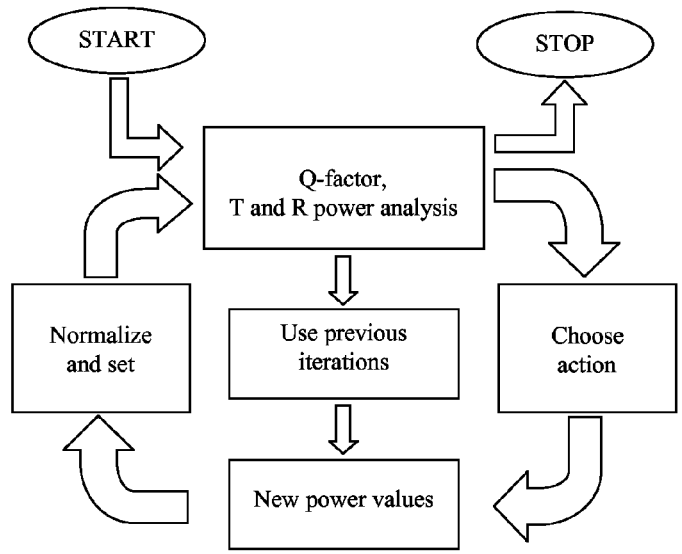
FIG. 1 is a diagram summarizing the working principle of the method in accordance with the present invention.

FIG. 1 illustrates the working principles of the method of the invention. As may be seen in this diagram, the procedure first of all takes all the useful data (Q-factor, transmitted and received power), identifying a suitable action to perform on the power transmitted for each channel according to the contents of a look-up table.

Advantageously, the method also envisages the use of a memory in the sense that all the data are memorized and analysed every preset number of steps to choose the best transmitted power configuration.

Before setting the transmitted powers, they are properly normalized to match the optimal work point of the transmission optical amplifier.

The procedure stops when the difference between successive steps is considered sufficiently small or when an predetermined maximum number of iterations is exceeded.

The present invention proposes an advantageous solution that could be termed a semi-blind procedure that:

i. exploits use of all the available information (for example the received powers, that are monitored too);
ii. relys on physical considerations (for example the greater part of the XPM is caused by adjacent channels); and
iii. is tailored on those situations that practically trigger the algorithm itself (for example the increase in channels—channel upgrade, system start-up, restoration after a fault condition, degradation of the system because of aging).

For better understanding, definition of the symbols of the method are given below.

| In particular, as input data there will be: | |
|---|---|
| N: | Maximum channel count; |
| i = 1, . . . , N: | Channel position in WDM spectrum; |
| $Q_i(k)$: | Q-factor of the $i^{th}$ channel at the $k^{th}$ iteration [dBm], all N values defining the array $\underline{Q}(k)$; |
| $T_i(k)$: | Transmitted power of the $i^{th}$ channel at the $k^{th}$ iteration [dBm], all N values defining the array $\underline{T}(k)$; |
| $R_i(k)$: | Received power of the $i^{th}$ channel at the $k^{th}$ iteration [dBm], all the N values defining the array $\underline{R}(k)$; |
| ϵ: | Error value [dB]. When the difference between the Q-factors at the $k^{th}$ and $(k-n)^{th}$ iterations, with n = 1, 2, . . . , M (M indicating memory), is less than ϵ for all the channels of the WDM comb, the convergence of the algorithm is affirmed; and |
| MaxIter: | Maximum number of iterations. |
| As inner data there will be: | |
| k: | Iteration number; |
| $Gt_i(k) = T_i(k) - R_i(k)$: | Gain tilt of the $i^{th}$ channel at the $k^{th}$ iteration [dB], all N values defining the array $\underline{Gt}(k)$; |
| M: | An integer representing the memory needed for the procedure, that memorizes $\underline{Q}(k)$, $\underline{T}(k)$ and $\underline{Gt}(k)$ for M − 1 consecutive steps. At the $M^{th}$ step, the memorized information is selected as the best transmitted power configuration; |
| $Q^{th}(k)$: | Threshold value for the Q-factor; |
| SQ(k): | Stored Q matrix at the $k^{th}$ iteration $[Q(k-M+1), \ldots, Q(k-1), Q(k)]$. Each row of SQ corresponds to a channel; |
| ST(k): | Stored transmitted powers matrix at the $k^{th}$ iteration $[T(k-M+1), \ldots, T(k-1), T(k)]$. Each row of ST corresponds to a channel; |
| $C_{Xi}(k)$: | defines three integers according to an appropriate configuration table where $X_i$ indicates one of $Q_i(k)$, $T_i(k)$ and $Gt_i(k)$; |
| $\underline{C}_i(k) = [C_{Qi}(k) C_{Ti}(k) C_{Gti}(k)]$: | Configuration array of the $i^{th}$ channel at the $k^{th}$ iteration; |
| Δ: | Power step or increment [dB]; |
| $Ac_i(k)$: | Action identifier of the $i^{th}$ channel at the $k^{th}$ iteration; it is an integer that determines the action to be performed on the transmitted power $T_i(k)$; |
| $f(\underline{Q}, \underline{Q}^{ref}, \underline{Q}^{ave})$: | A Function defining metrics used for comparing different arrays of the Q-factor and choosing the corresponding transmitted power as clarified below; |
| $\underline{Q}^{select}$: | Array of maximizing Q-factors f(.) as clarified below; and |
| look-up table A: | Also termed "action table", is defined for an inner channel of the WDM spectrum so that the first three columns are all the possible combinations of the values of the three $C_{Qi}$, $C_{Ti}$, $C_{Gti}$ and the fourth column is the corresponding action identifier Ac unequivocally defined. |

Tables similar to Table A and called $A_1$ and $A_N$ are also drawn up for the two "outer" channels at the edges of the spectrum (i=1 and i=N) as clarified below.

The configuration table can be advantageously obtained by sweeping through the WDM spectrum with a broad 3-channel sliding window and classifying the local dependence on wavelength of the transmitted power T, of the Q-factor and estimating the slope of the gain Gt (Gain tilt) of the central of the three channels under test and the two adjacent channels.

Figure 2A:
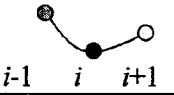

FIGS. 2a-2b show an advantageous example of the configuration table. In particular, FIG. 2a shows the part of the configuration table for the "inner" channels (that is, those that have an adjacent, neighbouring, channel on each side, i.e. i= 2 . . . N−1) whilst FIG. 2b shows the part of the configuration table for the "outer" or "edge" channels (that is, the channels that have a an adjacent channel on only one side, i.e. i=1 and i=N).

As may be seen in FIGS. 2a-2b, three numbers can be assigned to the channels under test, namely:

for the two channels at the edges of the comb (FIG. 2b), compare the values of T, Q, Gt of the edge channel itself with the corresponding values of the only adjacent channel; in this case the configuration of the above mentioned quantities can assume three values, increase, decrease or remain constant; and for all the inner channels, the possible configurations are listed in FIG. 2a in which it will be noted can assume 5 values.

As concerns the "action" identifier, various actions can be established, each identified by its own identifying number. Advantageously seven actions can be identified with Ac= 1, . . . , 7:

$A_c$=1: Either increase the power by one power step Δ or set it to the same figure as the neighbouring channel (if the difference is > the step);

$A_c$=2: Either decrease the power by one step Δ or set it at the same figure as the neighbouring channel (if the difference is > the step);

$A_c$=3: increase the power of the channel by Δ;

$A_c$=4: decrease the power of the channel by Δ;

$A_c$=5: set the power of the channel under test to the power of the adjacent channel having the best Q-factor;

$A_c$=6: set the power of the channel being tested (i) to the power of the left-hand adjacent channel (i.e. i−1); and $A_c$=7: set the power of the channel being tested (i) to the power of the right-hand adjacent channel (i.e. i+1).

FIG. 3 is a table of correspondence between implemented action and Action identifier Ac identifying number. The table also defines the correspondence function $Z(Ac_i(k))$, $T_i(k)$, that generates the new $T_i(k+1)$ value for the next step. The Action identifier is Ac determined unequivocally by applying the configuration array $C_i(k)$ to the look-up table (Action table) given in FIG. 4 (a-c).

As regards tables A (inner channels i=2 . . . N−1), $A_1$ (first channel), $A_N$ (last channel), advantageously the only difference between the three tables is the series of figures in the configuration array as shown in FIG. 2. The tables A, $A_1$, $A_N$, thus obtained are detailed respectively in FIGS. 4, 5 and 6.

The action "sets the transmitted powers" requires an appropriate normalization procedure to match the optimal input power of the EDFA at the transmit terminal. This procedure is discussed below (all quantities are in linear units). $N_1$ is defined as the number of channels having Q-factor greater than <Q(k)> at the $k^{th}$ iteration. The difference between the nominal input power of the EDFA and the total power of the channels is distributed as follows:

a percentage given by $N_1/N$ is distributed among the $N_1$ channels; and the remaining difference is distributed among all the channels.

We define:

$$a(k) = \frac{N_1}{N}\left(P_{in,opt} - \sum_{i=1}^{N} T_i(k+1)\right)$$

and $$b(k) = \left(P_{in,opt} - \sum_{i=1}^{N} T_i(k+1)\right) - a(k)$$

If $Q_i(k)$ is greater than (<Q(k)>+a predetermined quantity) then:

$$T_i(k+1) \to T_i(k+1)\left(1 + \frac{a(k)}{\sum_{i=1}^{N} T_i(k+1)}\right)$$

The residual quantity of power '$b(k)$' is equally distributed over all the channels:

$$T_i(k+1) \to T_i(k+1)\frac{P_{in,opt}}{P_{in,opt} + b(k)}$$

where $N_1$ is the number of channels having Q greater than <Q(k)> by a predetermined amount;

N is the channel count;

$T_i$ is the transmitted power of the $i^{th}$ channel; and $P_{in,opt}$ is the nominal power at the line input.

It is also necessary to define a metric function for analysis of the data that might be memorized during the iterations.

The definition of the metric function $f(Q, Q^{ref}, Q^{ave})$ is advantageously based on the idea that the distance between the initial and the final configurations of the Q-factor reaches its maximum when each channel achieves the optimal Q-factor, regardless of the initial Q-factor configuration. We thus have:

$$f(\underline{Q}, \underline{Q}^{ref}, \underline{Q}^{ave}) = G(\underline{Q}, \underline{Q}^{ave})\frac{D(\underline{Q}, \underline{Q}^{ref})}{W(\underline{Q}, \underline{Q}^{ref})}$$

where $\underline{Q}^{ref}$ is a reference Q-factor array (first column of SQ(k));

$\underline{Q}^{ave}=<SQ(k)>=[<\underline{Q}(k-M+1)>, \ldots, <\underline{Q}(k-1)>, <\underline{Q}(k)>]^T$ averages made on the channels;

$G(\underline{Q},\underline{Q}^{ave})$ is a cost function defined to understand when the optimal point of the Q-factor is not obtainable for all the channels because of some constraint such as an overall power limitation. The cost function decreases when the Q-factors of the channels are close to the maximum of $\underline{Q}^{ave}$;

$D(\underline{Q},\underline{Q}^{ref})$ is a distance function between the array of Q-factors under analysis (Q) and the array of reference Q-factors ($Q^{ref}$); and $W(\underline{Q},\underline{Q}^{ref})$ is a weight function; when the system has some constraint (such as a total power limitation), the weight function tends to favour the Q-factor array whose elements that have the greatest distance from a fixed percentage of the minimum $\underline{Q}^{ref}$.

For example, a possible implementation of the metric function is:

$$F(\underline{Q}, \underline{Q}^{ref}, \underline{Q}^{ave}) = \sum_{i=1}^{N} \frac{\max(\underline{Q}^{ave}) - Q_i}{\text{var}(\underline{Q})} \cdot \frac{Q_i - Q_i^{ref}}{[Q_i - 0.8\min(Q_{ref})]^2}$$

where $$\frac{\max(\underline{Q}^{ave}) - Q_i}{\text{var}(\underline{Q})}$$

is the Cost function, $$Q_i - Q_i^{ref}$$

is the Distance, and $$[Q_i - 0.8 \min(Q_{ref})]^2$$

is the Weight function.

Use of the memory can advantageously follow the steps:
1) consider the matrices SQ(k) and ST(k) and select for every value of the index i of the channel (row) the transmit power $T_i(k^*)$, where k* is chosen so that:

$$Q_i(k^*) = \max_{h \in \{k-M+1, \ldots, k\}} Q_i(h)$$

in this manner a new array T*(k) is created;
2) select the column Q(k) in the SQ matrix that maximizes the metric function with corresponding array of transmitted powers T(k) in ST;
3) set the transmitted powers according to $\underline{T}^*(k)$;
4) measure Q(k); and
5) if $f[Q(k^{**})] > f[Q(k^*)]$ then: $Q_{select} = Q(k^{})$ and $\underline{T}_{select} = T(k^{})$, otherwise $Q_{select} = Q(k^*)$ and $\underline{T}_{select} = T(k^*)$.

Figure 7:
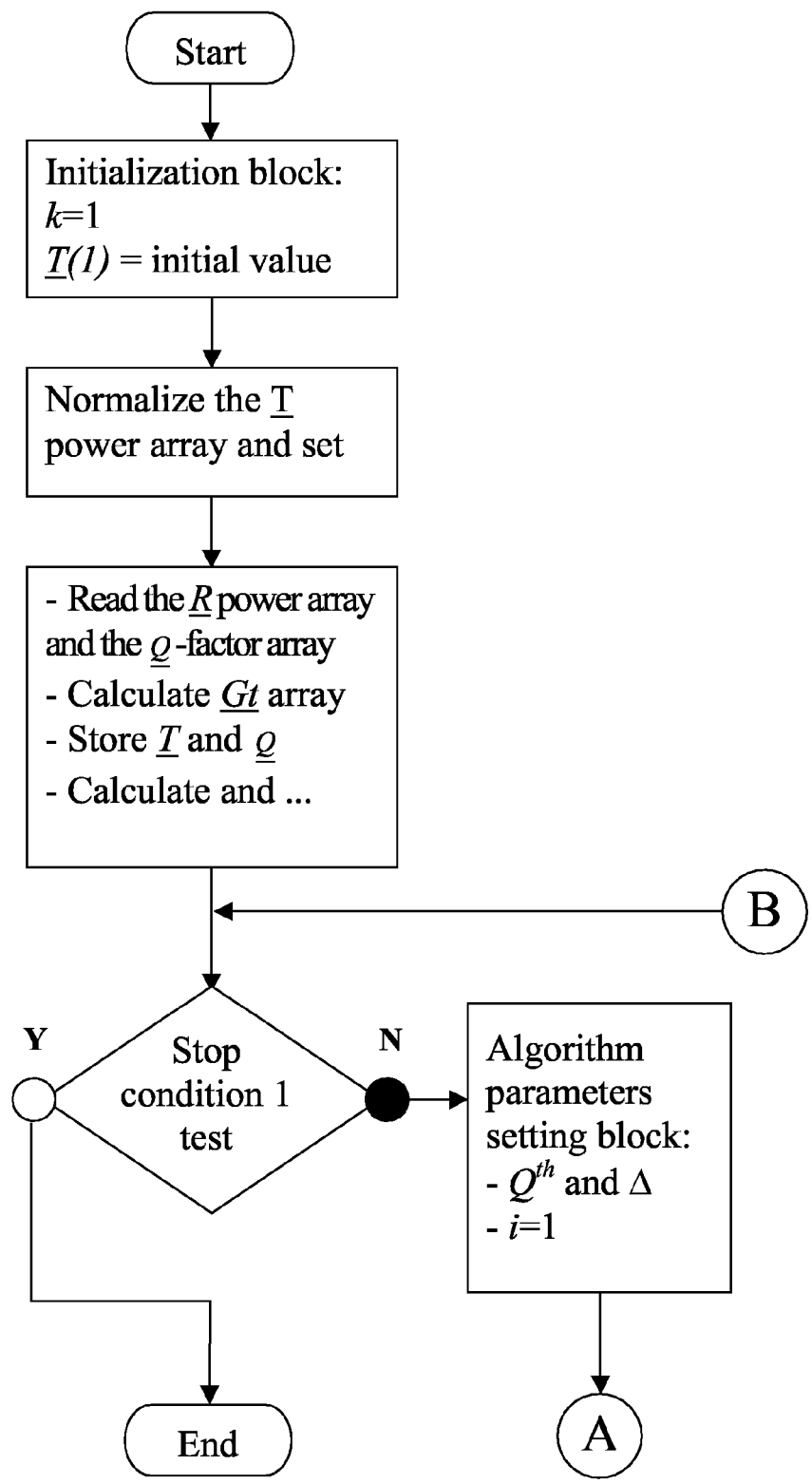

FIGS. 7-10 taken together are a flow diagram of the entire procedure applying the procedure of the present invention. FIG. 7 is the "Start" part of the procedure with an initial setting of the values and calculations up to the first stop test condition (Stop condition 1 test). This condition is advantageously a check on the number of iterations k=MaxIter that, if reached, leads to the "End" of the procedure.

Figure 8:
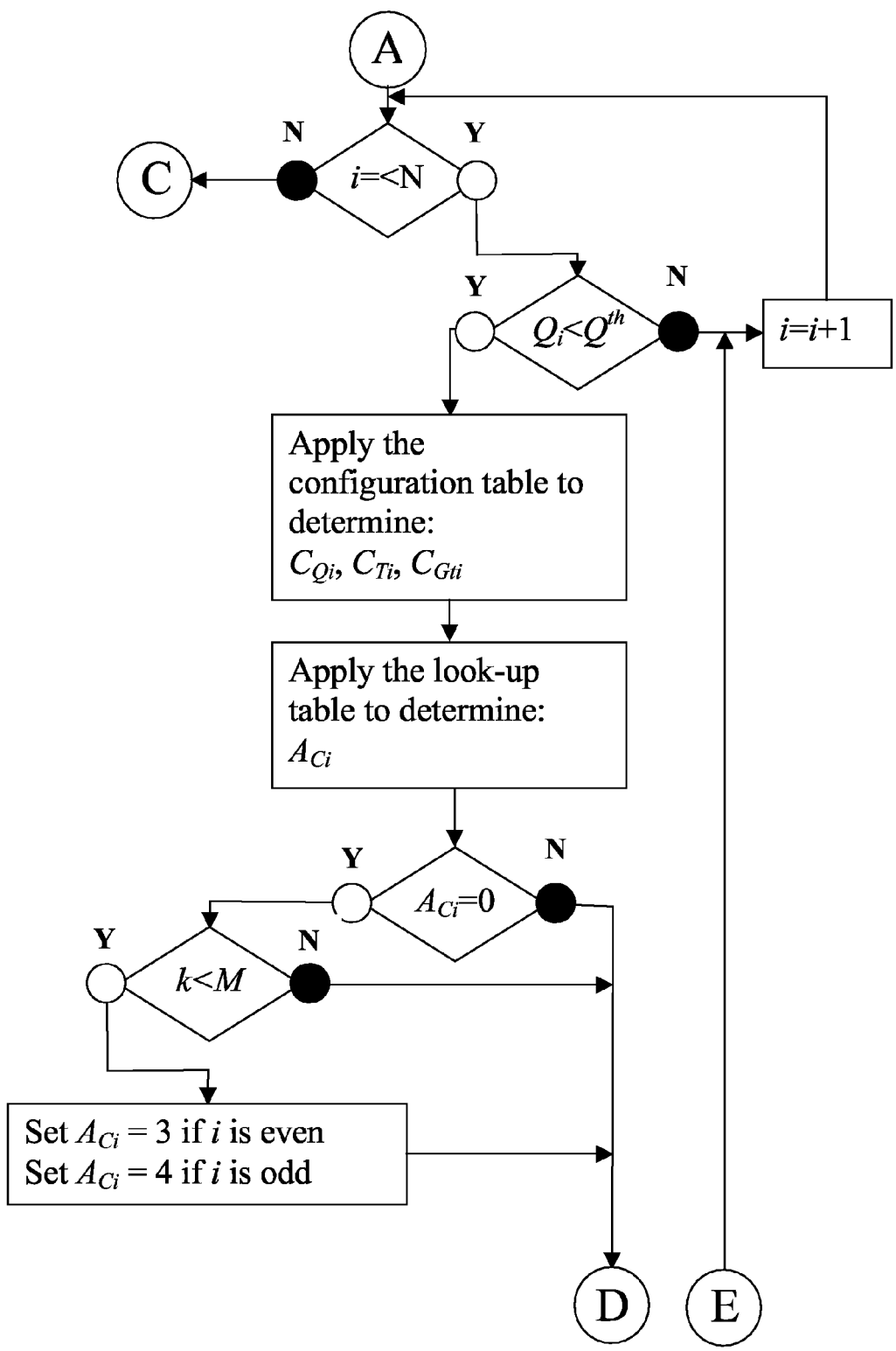
Figure 9:
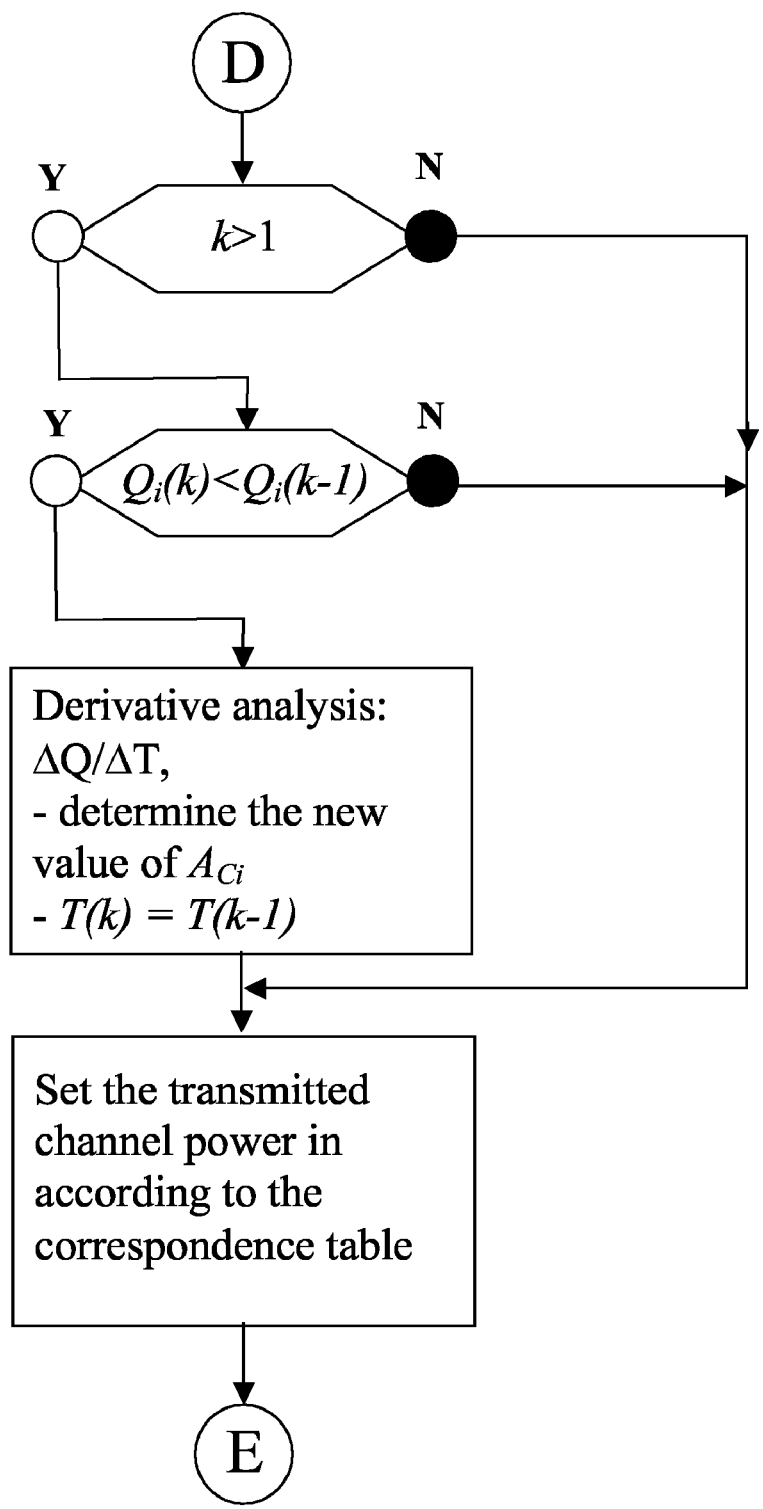

If the stop condition has not yet been met, the procedure proceeds to an algorithm parameters setting block ($Q^{th}$, $\Delta$, i=1) to then pass to second part of the procedure, denoted A in the Figures, which is illustrated collectively by FIGS. 8 and 9 that performs the actions on the channels.

Figure 10:
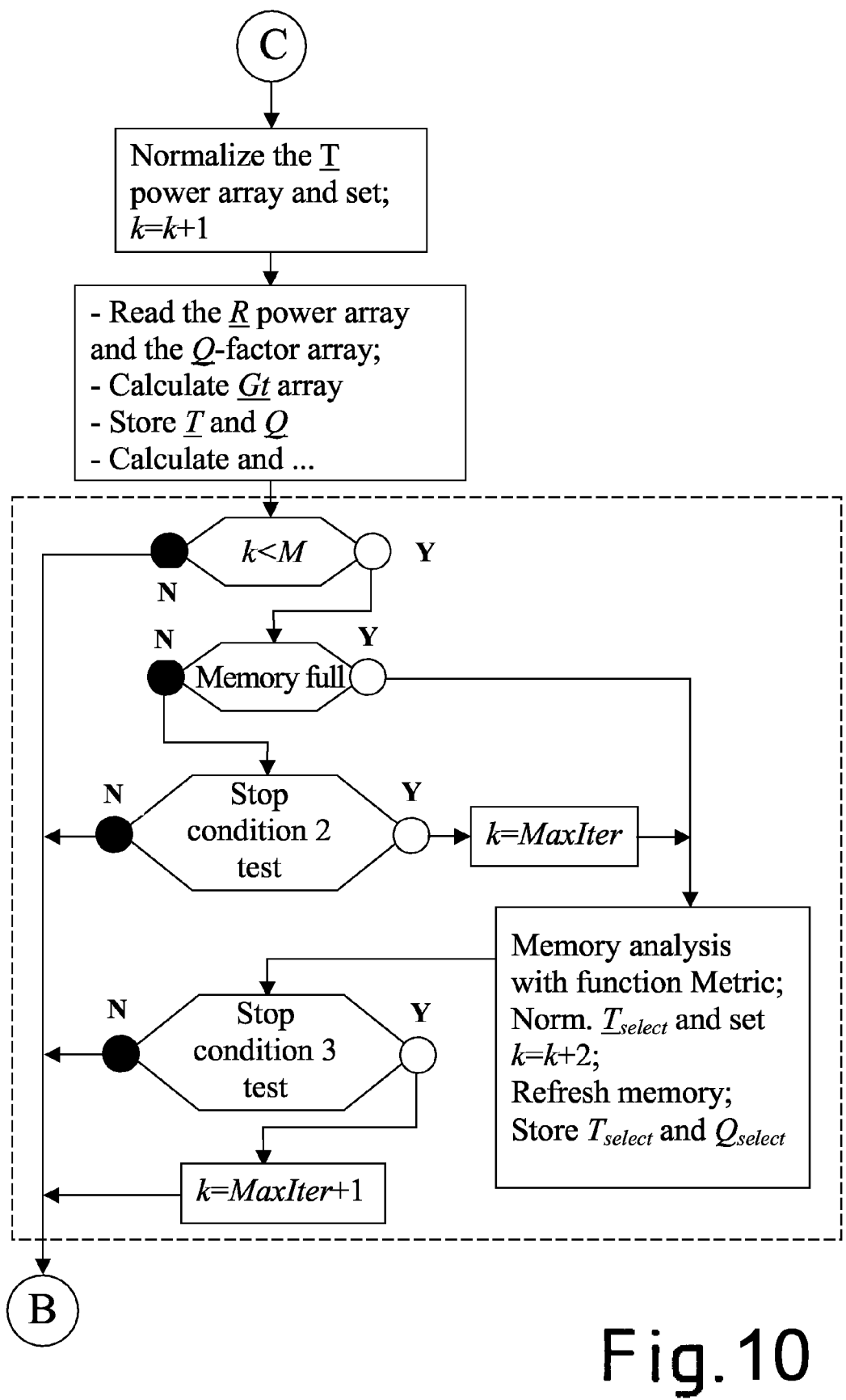

As may be seen in FIG. 8, as a first step of the part A, a check is performed as to whether i=<N; if this condition is condition is not true (N), i.e. if i>N, the algorithm proceeds to part C which is illustrated in FIG. 10. Conversely if the condition is true (Y) the algorithm proceeds to the procedure that concerns actions on the channels. Firstly a check is made as to whether $Q<Q^{th}$, if negative (N) the value of i is incremented (i=i+1) or, if affirmative (Y) leads to the application of the configuration table of FIG. 2, to find $C_{Qi}$, $C_{Ti}$, $C_{Gti}$, and to application of the look-up table (FIG. 4) to determine the Action identifier $A_{Ci}$. A check is then made for $A_{Ci}=0$? If negative, the algorithm passes directly to part D of the procedure which is illustrated in FIG. 9. If $A_{Ci}$ is equal to zero a check is made as to whether k<M and, if so (Y), the value of $A_{Ci}$ set and the procedure then proceeds to part D (FIG. 9).

Referring to FIG. 9 a check is made as to whether k>1 and if it is a check is made of whether $Q_i(k) < Q_i(k-1)$. If either one of these checks is not verified, the procedure jumps directly to set the transmitted channel power in accordance with the corresponding look-up table of FIG. 3. If both checks are verified, the procedure goes on to the derivative analysis in which $\Delta Q/\Delta T$ is calculated and a new value of $A_{Ci}$ determined. The procedure then sets the transmitted channel power according to the correspondence table of FIG. 3 before entering the procedure at point E in FIG. 8 where the index i is incremented and the check, i=<N?, repeated. If this condition is still met (Y) the procedure thus repeats the procedure to sets the transmitted channel power of the next channel and so forth until the power of all channels is set.

As described this iterative process continues until the condition i=<N of FIG. 8 is no longer verified, that is, selection of the actions $A_c$ has been performed for all the channels (N is the total number of channels). Once the selection of actions has been performed on all channels the procedure moves to part C to normalise and set the power levels; this part of the procedure is illustrated in FIG. 10. Referring to FIG. 10 one performs normalization of the power array T and k is incremented, k=k+1. The power array $\underline{R}$ and the $\underline{Q}$-factor array are then read and the array Gt calculated; and the values of T and Q memorised. The procedures is repeated before proceeding to the part of the procedure (bounded by the dashed line box of FIG. 10) that manages the use of memorized data.

As may be seen again in FIG. 10, a test k<M is performed and, if verified, one checks whether the memory is full? If the first test fails, the procedure returns to point B of FIG. 7 (i.e. the stop condition test 1) and, if not verified, the entire procedure is repeated.

If at the beginning both the k<M and the memory-full tests are positive (Y), one passes directly to the memory analysis block and then to the third stop condition test.

However, if only the full memory test fails, one goes on to the second stop condition test. This second condition can be advantageously verified if:

$$|Q_i(k) < Q_i(k-n)| < \epsilon \ \forall i=1, \ldots, N, n=1, \ldots, M$$

to then, in case of negative result, go on to part B and in case of positive result, assign k=MaxIter and go on to analysis of the data in memory with the metric function; normalize $T_{select}$ and set k=k+2; update the memory, memorize the new $T_{select}$ and $Q_{select}$ and perform the test of stop condition 3. This third condition can advantageously be a check of effectiveness $Q_{select} = Q(k-M+1)$. In one case, go directly to part B and, in the other case, first assign k=MaxIter+1.

It is now clear that the predetermined purposes have been achieved.

With the method of the present invention, all the conditions allowing simple and practical use of the BER in the calculation of the power pre-emphasis are assured.

The method discussed can be readily adapted to every type of situation that calls for the new pre-emphasis calculation. For example, a smooth convergence (i.e. without abrupt changes) is to ensured in the case of channel upgrades so that the pre-emphasis does not affect the existing channels. But this is not strictly necessary in the case of recovery after a failure because the traffic is already lost and the system can adapt to a faster convergence.

Moreover, the pre-emphasis process is slow enough to not interfere with other check mechanisms like optimisation of the decision threshold and allows reliable BER measurement.

Any data processing can be performed off-line to simplify implementation and reduce communication time between remote nodes.

The method can be realized—effectively and economically—by means of some known (and therefore not described here because readily imaginable to those skilled in the art) computational devices arranged for that purpose.

The method in accordance with the present invention can also be used to compensate for other effects that do not refer to OSNR degradation but still damage performance. As an example, it can be used to reduce the penalties dependent on the receiver (for example, different sensitivity of the receiver or loss of a channel dependent demultiplexer) and probably also limited degradation induced by the PMD.

Compared with the widespread techniques based on OSNR, use of the BER directly allows optimisation of performance in either linear or nonlinear regime. In addition, it does not need any additional measuring equipment (such as for example an optical spectrum analyser) since the BER is directly monitored at the receivers by means of the FEC chipset.

In overview, the procedure of the invention requires a collection of the most pertinent data (Q-factor, transmitted and received powers for each channel), then selects and applies an appropriate action on the transmitted power of each channel. All the channels are processed in parallel and this method can be iterated until reaching some stop condition, advantageously the condition "no significant improvement is any longer obtained".

The method envisages the use of a memory; in which all data can be stored and analysed every fixed number of steps, exploiting the best of all the previously collected data.

Naturally, the above description of an embodiment applying the innovative principles of the present invention is given by way of non-limiting example of said principles within the scope of the exclusive right claimed here. For example, if desired, in an advantageous embodiment of the method, the above-described method can be simplified by removing dependence on the gain tilt. This simplifies the practical implementation of the pre-emphasis procedure. The new procedure is obtained by changing the look-up table of the actions and replacing the tables A, $A_1$ and $A_N$ shown in FIGS. 4, 5 and 6 with the corresponding simplified tables shown in FIGS. 11, 12 and 13 and jumping over any reference to the gain tilt in the procedure and in the flow chart explained above. This could give a less accurate result but removes dependence on gain tilt that could be affected by both measurements and fitting errors.

The invention claimed is:

1. A method of providing power pre-emphasis for N optical channels in a Wavelength Division Multiplex (WDM) signal, each optical channel having a set of one or more characteristics that are representative of the channel, and wherein at least one characteristic is a function of a Bit Error Rate (BER), the method comprising:
   for each optical channel i in the WDM signal,
   a) evaluating characteristics for an $i^{th}$ channel and for each channel adjacent to the $i^{th}$ channel;
   b) comparing the characteristics of the $i^{th}$ channel with the characteristics of the corresponding adjacent channels;
   c) selecting a predetermined action to be performed on the transmitted power of the $i^{th}$ channel based on the results of the comparison; and
   d) performing the selected predetermined action on the transmitted power of the $i^{th}$ channel;
   e) calculating a metric quality function of all of the optical channels based on their transmitted powers as modified by the selected predetermined actions; and
   f) iteratively repeating steps (a)-(e) until the quality improvement is less than a predetermined figure, or until a predetermined maximum number of iterations is reached.

2. The method of claim 1 wherein the channel characteristics comprise at least one characteristic that is a function of the transmitted power $T_i$ on the $i^{th}$ channel.

3. The method of claim 2 wherein the channel characteristics further comprise a Q-factor.

4. The method of claim 3 further comprising:
   storing values for the Q-factor of each optical channel to a matrix SQ at one or more iterations k, such that SQ(k) comprises:

[Q(k−M+1), . . . ,Q(k−1),Q(k)]; and storing values for the transmitted power of each optical channel to a matrix ST at one or more iterations k, such that that ST(k) comprises:

[T(k−M+1), . . . ,T(k−1),T(k)];

wherein:
   each row of SQ corresponds to an optical channel;
   each row of ST corresponds to an optical channel; and
   M is an integer that represents an amount of memory needed to store an array of Q-factor values, an array of transmitted powers values, and an array unbalanced gain values.

5. The method of claim 4 further comprising:
   a) for each channel i, selecting a transmit power $T_i(k^*)$ from the matrices SQ(k) and ST(k), with $k^*$ being selected such that $Q_i(k^*) = \max_{h \in \{k-M+1, \ldots, k\}} Q_i(h)$ thereby creating a new array $T^*(k)$;
   b) selecting a column $Q(k^{})$ in the matrix SQ such that the metric quality function with a corresponding array of transmit powers $T(k^{})$ in ST is maximized;
   c) setting the transmit powers according to $T(k^*)$;
   d) measuring Q(k); and
   e) if $f[Q(k^{**})] > f[Q(k^*)]$
   then setting $Q_{select} = Q(k^{})$, and setting $T_{select} = T(k^{})$,
   otherwise setting $Q_{select} = Q(k^*)$, and setting $T_{select} = T(k^*)$.

6. The method of claim 1 further comprising normalizing the selected predetermined actions prior to performing the actions, so as to prevent a total transmit power of all the optical channels from exceeding a predetermined threshold.

7. The method of claim 6 further comprising determining a difference between an optimal power $P_{in,opt}$ and the total transmit power of the optical channels prior to normalizing the selected predetermined action.

8. The method of claim 7 further comprising distributing the total transmit power of the optical channels by:
   a percentage $N_1/N$ of the total transmit power prior to normalizing the selected predetermined action is distributed only between $N_1$ channels, wherein $N_1$ defines the number of optical channels having a Q-factor greater than $<Q(k)>$ at the $k^{th}$ iteration, where Q(k) is a vector of the Q-factors of all the optical channels at the $k^{th}$ iteration; and
   a residual quantity b(k) of the total transmit power is distributed among all the optical channels.

9. The method of claim 7 wherein if $Q_1(k)$ exceeds $<Q(k)>$ by a predefined quantity, then:
   the transmit power for the $i^{th}$ channel is $$T_i(k+1) \rightarrow T_i(k+1)\left(1 + \frac{a(k)}{\sum_{i=1}^{N} T_i(k+1)}\right); \text{ and}$$

the residual quantity b(k) of power is evenly distributed among all the optical channels such that:

$$T_i(k+1) \rightarrow T_i(k+1)\frac{P_{in,opt}}{P_{in,opt} + b(k)};$$

where $$a(k) = \frac{N_1}{N}\left(P_{in,opt} - \sum_{i=1}^{N} T_i(k+1)\right), \text{ and}$$

$$b(k) = \left(P_{in,opt} - \sum_{i=1}^{N} T_i(k+1)\right) - a(k); \text{ and}$$

wherein
- $N_1$ is the number of channels having a Q greater than $<Q(k)>$ by a predefined quantity;
- N is a channel counter;
- $T_i$ is the transmitting power of the $i^{th}$ channel; and
- $P_{in,opt}$ is a nominal power at a line input.

10. The method of claim 1 further comprising defining an action table to relate predetermined actions $A_c$ to numerical figures $C_{xi}$, wherein:
- the actions $A_c$ comprise predetermined actions that may be performed on the transmitted power of the $i^{th}$ channel; and
- the numerical figures $C_{xi}$ correspond to the results of the comparisons between each of the characteristics of the $i^{th}$ channel and the characteristics of the corresponding adjacent channels.

11. The method of claim 10 wherein a set of characteristics for an optical channel i is denoted $X_i$, and further comprising defining a different numerical figure $C_{xi}$ for characteristic set $X_i$ as follows:

for $i = 1$ or $i = N$:

$X_N > X_{N-1}$ or $X_1 < X_2$;

$X_N < X_{N-1}$ or $X_1 > X_2$;

$X_N = X_{N-1}$ or $X_1 = X_2$; and for $i = 2, \ldots, N-1$:

$X_i < X_{i-1}$ and $X_i X_{i+1}$;

$X_{i-1} > X_i > X_{i+1}$ or $X_{i-1} >= X_i > X_{i+1}$;

$X_{i-1} = < X_i < X_{i+1}$ or $X_{i-1} < X_i = < X_{i+1}$;

$X_i > X_{i-1}$ and $X_i > X_{i+1}$; and $X_{i-1} = X_i = X_{i+1}$.

12. The method of claim 11 further comprising defining a predetermined action $A_c$ in the action table for each possible combination of the numerical figures $C_{xi}$.

13. The method of claim 10 wherein the predetermined actions $A_c$ comprise:
- increase the transmit power by the greater of one power step $\Delta$ and the difference between the transmit power of the $i^{th}$ channel and that of the adjacent channel;
- decrease the transmit power by the greater of one power step $\Delta$ and the difference between the transmit power of the $i^{th}$ channel and that of the adjacent channel;
- increase the transmit power of the channel by one power step $\Delta$;
- decrease the transmit power of the channel by one power step $\Delta$;
- set the transmit power of the $i^{th}$ channel equal to the transmit power of the adjacent channel having the best Q-factor;
- set the transmit power of the $i^{th}$ channel equal to the transmit power of the $(i-1)^{th}$ channel; and
- set the transmit power of the $i^{th}$ channel equal to the transmit power of the $(i+1)^{th}$ channel.

14. The method of claim 13 wherein the predetermined actions $A_c$ are indicated in the action table by the numerical values 1-7.

15. The method of claim 1 wherein the metric quality function is given by:

$$f(\underline{Q}, \underline{Q}^{ref}, \underline{Q}^{ave}) = G(\underline{Q}, \underline{Q}^{ave})\frac{D(\underline{Q}, \underline{Q}^{ref})}{W(\underline{Q}, \underline{Q}^{ref})}; \text{ and}$$

wherein
- $\underline{Q}^{ref}$ is an array of reference Q-factors;
- $\underline{Q}^{ave} = <S\underline{Q}(k)> = [<\underline{Q}(k-M+1)>, \ldots, <\underline{Q}(k-1)>, <\underline{Q}(k)>]^T$ averages made on the channels;
- $G(\underline{Q},\underline{Q}^{ave})$ is a predetermined cost function that decreases when the Q-factors of the channels near the maximum of $\underline{Q}^{ave}$;
- $D(\underline{Q},\underline{Q}^{ref})$ is a distance function between an array of Q-factors $(\underline{Q})$ under analysis and $\underline{Q}^{ref}$; and
- $W(\underline{Q},\underline{Q}^{ref})$ is a predetermined weight function.

16. The method of claim 15 wherein:
the cost function $G(\underline{Q},\underline{Q}^{ave})$ is:

$$\frac{\max(\underline{Q}^{ave}) - Q_i}{\text{var}(\underline{Q})};$$

the distance function $D(\underline{Q},\underline{Q}^{ref})$ is:

$Q_i - Q_i^{ref}$; and the weight function $W(\underline{Q},\underline{Q}^{ref})$ is:

$[Q_i - 0.8 \min(Q_{ref})]^2$.

17. A method of providing power pre-emphasis for N optical channels in a Wavelength Division Multiplex (WDM) signal, each optical channel having a set of one or more characteristics that are representative of the channel, and wherein at least one characteristic is a function of a Bit Error Rate (BER), the method comprising:
for each optical channel i in the WDM signal,
- a) evaluating characteristics for an $i^{th}$ channel and for each channel adjacent to the $i^{th}$ channel;
- b) comparing the characteristics of the $i^{th}$ channel with the characteristics of the corresponding adjacent channels;
- c) selecting a predetermined action to be performed on the transmitted power of the $i^{th}$ channel based on the results of the comparison; and
- d) performing the selected predetermined action on the transmitted power of the $i^{th}$ channel;
- e) calculating a metric quality function of all of the optical channels based on their transmitted powers as modified by the selected predetermined actions; and
- f) iteratively repeating steps (a)-(e) until the quality improvement is less than a predetermined figure, or until a predetermined maximum number of iterations is reached;

wherein the channel characteristics comprise at least one characteristic that is a function of the transmitted power $T_i$ on the $i^{th}$ channel;

wherein the channel characteristics further comprise a Q-factor; and wherein the characteristics further comprise a characteristic that is a function of a gain tilt:

$$Gt_i(k)=T_i(k)-R_i(k);$$

where $T_i(k)$ is the transmitted power of the $i^{th}$ channel on the $k^{th}$ iteration; and $R_i(k)$ is a received power of the $i^{th}$ channel at the $k^{th}$ iteration.

18. A computing device for providing power pre-emphasis for N optical channels in a Wavelength Division Multiplex (WDM) signal, each optical channel having a set of one or more characteristics that are representative of the channel, and wherein at least one characteristic is a function of a Bit Error Rate (BER), the device comprising:
a memory configured to periodically store data that is analyzed by the computing device; and
a controller connected to the memory, the controller being programmed, for each optical channel i in the WDM signal, to:
a) evaluate characteristics for an $i^{th}$ channel and for each channel adjacent to the $i^{th}$ channel;
b) compare the characteristics of the $i^{th}$ channel with the characteristics of the corresponding adjacent channels;
c) select a predetermined action to be performed on the transmitted power of the $i^{th}$ channel based on the results of the comparison; and
d) perform the selected predetermined action on the transmitted power of the $i^{th}$ channel;
e) calculate a metric quality function of all of the optical channels based on their transmitted powers as modified by the selected predetermined actions; and
f) iteratively repeat steps (a)-(e) until the quality improvement is less than a predetermined figure, or until a predetermined maximum number of iterations is reached.

19. The computing device of claim 18 wherein the channel characteristics comprise at least one characteristic that is a function of the transmitted power $T_i$ on the $i^{th}$ channel.

20. The computing device of claim 19 wherein the channel characteristics further comprise a Q-factor.

21. The computing device of claim 20 wherein the characteristics further comprise a characteristic that is a function of a gain tilt:

$$Gt_i(k)=T_i(k)-R_i(k);$$

where $T_i(k)$ is the transmitted power of the $i^{th}$ channel on the $k^{th}$ iteration; and $R_i(k)$ is a received power of the $i^{th}$ channel at the $k^{th}$ iteration.

22. The computing device of claim 20 wherein the controller is further configured to:
store values in the memory for the Q-factor of each optical channel to a matrix SQ at one or more iterations k, such that SQ(k) comprises:

$$[Q(k-M+1), \ldots, Q(k-1), Q(k)]; \text{ and}$$

store values in the memory for the transmitted power of each optical channel to a matrix ST at one or more iterations k, such that ST(k) comprises:

$$[T(k-M+1), \ldots, T(k-1), T(k)];$$

wherein:
each row of SQ corresponds to an optical channel;
each row of ST corresponds to an optical channel; and M is an integer that represents an amount of memory needed to store an array of Q-factor values, an array of transmitted powers values, and an array of unbalanced gain values.

23. The computing device of claim 22 wherein the controller is further configured to:
a) for each channel i, select a transmit power $T_i(k^*)$ from the matrices SQ(k) and ST(k), with k* being selected such that $$Q_i(k^*)=\max_{h\in\{k-M+1,\ldots,k\}}Q_i(h)$$

thereby creating a new array $\underline{T}^*(k)$;
b) select a column $\underline{Q}(k^{})$ in the matrix SQ such that the metric quality function with a corresponding array of transmit powers $\underline{T}(k^{})$ in ST is maximized;
c) set the transmit powers according to $\underline{T}(k^*)$;
d) measure $\underline{Q}(k)$; and
e) if $f[\underline{Q}(k^{**})]>f[\underline{Q}(k^*)]$
then set $\underline{Q}_{select}=\underline{Q}(k^{})$, and set $\underline{T}_{select}=\underline{T}(k^{})$, otherwise set $\underline{Q}_{select}=\underline{Q}(k^*)$, and set $\underline{T}_{select}=\underline{T}(k^*)$.

24. The computing device of claim 18 wherein the controller is further configured to normalize the selected predetermined actions prior to performing the actions, so as to prevent a total transmit power of all the optical channels from exceeding a predetermined threshold.

25. The computing device of claim 24 wherein the controller is further configured to determine a difference between an optimal power $P_{in,opt}$ and the total transmit power of the optical channels prior to normalizing the selected predetermined action.

26. The computing device of claim 25 wherein the controller is further configured to distribute the total transmit power of the optical channels by:
a percentage $N_1/N$ of the total transmit power prior to normalizing the selected predetermined action is distributed only between $N_1$ channels, wherein $N_1$ defines the number of optical channels having a Q-factor greater than $<Q(k)>$ at the $k^{th}$ iteration, where Q(k) is a vector of the Q-factors of all the optical channels at the $k^{th}$ iteration; and
a residual quantity b(k) of the total transmit power is distributed among all the optical channels.

27. The computing device of claim 25 wherein if $Q_1(k)$ exceeds $<Q(k)>$ by a predefined quantity, then:
the transmit power for the $i^{th}$ channel is $$T_i(k+1) \rightarrow T_i(k+1)\left(1+\frac{a(k)}{\sum_{i=1}^{N}T_i(k+1)}\right); \text{ and}$$

the residual quantity b(k) of power is evenly distributed among all the optical channels such that:

$$T_i(k+1) \rightarrow T_i(k+1)\frac{P_{in,opt}}{P_{in,opt}+b(k)};$$

where $$a(k) = \frac{N_1}{N}\left(P_{in,opt} - \sum_{i=1}^{N}T_i(k+1)\right), \text{ and}$$

$$b(k) = \left(P_{in,opt} - \sum_{i=1}^{N}T_i(k+1)\right) - a(k); \text{ and}$$

wherein
- $N_i$ is the number of channels having a Q greater than $<Q(k)>$ by a predefined quantity;
- N is a channel counter;
- $T_i$ is the transmitting power of the $i^{th}$ channel; and
- $P_{in,opt}$ is a nominal power at a line input.

28. The computing device of claim 18 wherein the controller is further configured to define an action table in the memory to relate predetermined actions $A_c$ to numerical figures $C_{xi}$, wherein:
- the actions $A_c$ comprise predetermined actions that may be performed on the transmitted power of the $i^{th}$ channel; and
- the numerical figures $C_{xi}$ correspond to the results of the comparisons between each of the characteristics of the $i^{th}$ channel and the characteristics of the corresponding adjacent channels.

29. The computing device of claim 28 wherein a set of characteristics for an optical channel i is denoted $X_i$, and further comprising defining a different numerical figure $C_{xi}$ for characteristic set $X_i$ as follows:

for $i = 1$ or $i = N$:

$X_N > X_{N-1}$ or $X_1 < X_2$;

$X_N < X_{N-1}$ or $X_1 > X_2$;

$X_N = X_{N-1}$ or $X_1 = X_2$; and for $i = 2, \ldots, N-1$:

$X_i < X_{i-1}$ and $X_i X_{i+1}$;

$X_{i-1} > X_i > X_{i+1}$ or $X_{i-1} >= X_i > X_{i+1}$;

$X_{i-1} = < X_i < X_{i+1}$ or $X_{i-1} < X_i = < X_{i+1}$;

$X_i > X_{i-1}$ and $X_i > X_{i+1}$; and $X_{i-1} = X_i = X_{i+1}$.

30. The computing device of claim 29 wherein the controller is configured to define a predetermined action $A_c$ in the action table for each possible combination of the numerical figures $C_{xi}$.

31. The computing device of claim 28 wherein the predetermined actions $A_c$ comprise:
- increase the transmit power by the greater of one power step $\Delta$ and the difference between the transmit power of the $i^{th}$ channel and that of the adjacent channel;
- decrease the transmit power by the greater of one power step $\Delta$ and the difference between the transmit power of the $i^{th}$ channel and that of the adjacent channel;
- increase the transmit power of the channel by one power step $\Delta$;
- decrease the transmit power of the channel by one power step $\Delta$;
- set the transmit power of the $i^{th}$ channel equal to the transmit power of the adjacent channel having the best Q-factor;
- set the transmit power of the $i^{th}$ channel equal to the transmit power of the $(i-1)^{th}$ channel; and
- set the transmit power of the $i^{th}$ channel equal to the transmit power of the $(i+1)^{th}$ channel.

32. The computing device of claim 31 wherein the predetermined actions $A_c$ are indicated in the action table by the numerical values 1-7.

33. The computing device of claim 18 wherein the metric quality function is given by:

$$f(\underline{Q}, \underline{Q}^{ref}, \underline{Q}^{ave}) = G(\underline{Q}, \underline{Q}^{ave}) \frac{D(\underline{Q}, \underline{Q}^{ref})}{W(\underline{Q}, \underline{Q}^{ref})}; \text{ and}$$

wherein
- $\underline{Q}^{ref}$ is an array of reference Q-factors;
- $\underline{Q}^{ave} = <\underline{SQ(k)}> = [<\underline{Q}(k-M+1)>, \ldots, <\underline{Q}(k-1)>, <\underline{Q}(k)>]^T$ averages made on the channels;
- $G(\underline{Q},\underline{Q}^{ave})$ is a predetermined cost function that decreases when the Q-factors of the channels near the maximum of $\underline{Q}^{ave}$;
- $D(\underline{Q},\underline{Q}^{ref})$ is a distance function between an array of Q-factors (Q) under analysis and $\underline{Q}^{ref}$; and
- $W(\underline{Q},\underline{Q}^{ref})$ is a predetermined weight function.

34. The computing device of claim 33 wherein:
the cost function $G(\underline{Q},\underline{Q}^{ave})$ is:

$$\frac{\max(\underline{Q}^{ave}) - Q_i}{\text{var}(\underline{Q})};$$

the distance function $D(\underline{Q},\underline{Q}^{ref})$ is:

$Q_i - Q_i^{ref}$; and the weight function $W(\underline{Q},\underline{Q}^{ref})$ is:

$[Q_i - 0.8 \min(Q_{ref})]^2$.

* * * * *

UNITED STATES PATENT AND TRADEMARK OFFICE
CERTIFICATE OF CORRECTION

PATENT NO. : 7,945,161 B2
APPLICATION NO. : 11/572549
DATED : May 17, 2011
INVENTOR(S) : Ciaramella et al.

It is certified that error appears in the above-identified patent and that said Letters Patent is hereby corrected as shown below:

In Fig. 3, Sheet 2 of 13, Line 1, delete "CORRISPONDENCE TABLE: Z" and insert -- CORRESPONDENCE TABLE: Z --, therefor.

In Column 10, Line 12, in Claim 4, delete "that that" and insert -- that --, therefor.

In Column 11, Line 41, in Claim 11, delete "$X_i X_{i+1}$;" and insert -- $X_i < X_{i+1}$; --, therefor.

In Column 12, Line 18, in Claim 15, delete "$Q^{ave}$" and insert -- $\underline{Q}^{ave}$ --, therefor.

In Column 13, Line 62, in Claim 22, delete "that that" and insert -- that --, therefor.

In Column 14, Line 19, in Claim 23, delete "T(k)," and insert -- $\underline{T}$(k), --, therefor.

In Column 15, Line 32, in Claim 29, delete "$X_i X_{i+1}$;" and insert -- $X_i < X_{i+1}$; --, therefor.

In Column 16, Line 28, in Claim 33, delete "$Q^{ave}$" and insert -- $\underline{Q}^{ave}$ --, therefor.

Signed and Sealed this
Twenty-seventh Day of December, 2011

David J. Kappos
*Director of the United States Patent and Trademark Office*